United States Patent
Song et al.

(10) Patent No.: US 8,200,685 B2
(45) Date of Patent: Jun. 12, 2012

(54) ASPECT-LEVEL NEWS BROWSING SERVICE SYSTEM AND METHOD FOR MITIGATING EFFECTS OF MEDIA BIAS

(75) Inventors: June Hwa Song, Daejon (KR); Soun Eil Park, Daejon (KR); Sang Jeong Lee, Seoul (KR); Seung Woo Kang, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 246 days.

(21) Appl. No.: 12/624,862

(22) Filed: Nov. 24, 2009

(65) Prior Publication Data

US 2011/0022595 A1 Jan. 27, 2011

(30) Foreign Application Priority Data

Jul. 23, 2009 (KR) .................... 10-2009-0067361

(51) Int. Cl.
*G06F 17/30* (2006.01)
(52) U.S. Cl. ........ 707/759; 707/760; 707/769; 707/736; 707/737; 707/738; 707/770; 707/771; 707/705; 707/708; 707/709; 709/201; 709/203; 709/217
(58) Field of Classification Search .......... 707/705–709, 707/736–738, 758, 769–771; 709/201, 203, 709/217
See application file for complete search history.

(56) References Cited

U.S. PATENT DOCUMENTS

| | | | |
|---|---|---|---|
| 7,867,511 B2 * | 1/2011 | Anderson et al. ............ | 424/449 |
| 2002/0126143 A1 * | 9/2002 | Bae et al. ..................... | 345/723 |
| 2002/0146168 A1 * | 10/2002 | Lee et al. ..................... | 382/165 |
| 2003/0123850 A1 * | 7/2003 | Jun et al. ...................... | 386/68 |
| 2006/0031879 A1 * | 2/2006 | Colter et al. .................. | 725/45 |
| 2006/0253489 A1 * | 11/2006 | Kahn et al. ................... | 707/102 |
| 2007/0260586 A1 * | 11/2007 | Savona et al. ................. | 707/3 |
| 2009/0276809 A1 * | 11/2009 | Choi et al. .................... | 725/61 |

FOREIGN PATENT DOCUMENTS

| KR | 1020000049383 A | 8/2000 |
|---|---|---|
| KR | 1020010076489 A | 8/2001 |

OTHER PUBLICATIONS

Park et al., NewsCube: Delivering Multiple Aspects of News to Mitigate Media Bias, CHI 2009, Apr. 6, 2009, Boston, MA.

* cited by examiner

*Primary Examiner* — Frantz Coby
(74) *Attorney, Agent, or Firm* — Scully, Scott, Murphy & Presser, P.C.

(57) ABSTRACT

The present invention relates to an aspect-level news browsing service system and method for mitigating effects of media bias, which group news articles having different aspects on the same event on the basis of aspects, and simultaneously provide grouped news articles to users. The aspect-level news browsing service system may include a user terminal for accessing a news service server over an Internet and receiving aspect-level news article information from the news service server. A news provision server may transmit news article information to the news service server over the Internet. The news service server may extract aspects from the received news article information, classify the news article information based on the extracted aspects, and may transmit the aspect-level news article information to the user terminal depending on the aspects to enable the news article information to be displayed. The Internet may be configured to connect the user terminal to the news service server.

16 Claims, 8 Drawing Sheets

ASPECT-LEVEL NEWS BROWSING SERVICE SYSTEM AND METHOD FOR MITIGATING EFFECTS OF MEDIA BIAS

BACKGROUND OF THE INVENTION

1. Field of the Invention

The present invention relates, in general, to a news browsing service system and method for mitigating the effects of media bias. More particularly, the present invention relates to a news browsing service system and method which classify news article information into groups on the basis of various aspects present in news article information, and provide classified information to users, thus inducing the users to have an unbiased viewpoint on news article information based on such classified information.

2. Description of the Related Art

Conventional technology (disclosed in Korean Pat. Appln. No. 10-2000-003667 filed on Jun. 19, 2000 and Korean Pat. Appln. No. 10-2000-0005312 filed on Feb. 3, 2000) is intended to group news articles related to the same event or the same topic and provide such grouped information, thus allowing users to easily read event-based news articles.

For this purpose, technologies for automatically classifying news articles covering the same event or the same topic and providing the classified news articles to users have been proposed.

However, in such a situation, since it is difficult for users to easily distinguish between and read a variety of news articles reported from different viewpoints, the above technologies are not useful in overcoming the bias of media.

Such media bias inevitably occurs because a news producer' subjective valuation intervenes in all stages of a news production process, including the gathering, writing and editing of a news article. This is an inherent limitation of a news production process, and causes readers to understand a news article from a biased viewpoint, thus resulting in an increase in extreme political polarization or in conflicts of important social issues.

SUMMARY OF THE INVENTION

Accordingly, the present invention has been made keeping in mind the above problems occurring in the prior art, and an aspect of the present invention may provide a news browsing service system and method, which classify news article information having different viewpoints on the same event or topic on the basis of aspects, and simultaneously provide classified news article information, thus allowing users to collectively understand a relevant event from various viewpoints.

Another aspect of the present invention may provide a news browsing service system and method, which provide an aspect-level browsing interface required to effectively transmit various aspects of a news article to users, thus inducing the users to read news articles from an unbiased viewpoint.

The present invention may provide an aspect-level news browsing service system for mitigating effects of media bias, comprising a user terminal for accessing a news service server over an Internet and receiving aspect-level news article information from the news service server; a news provision server for transmitting news article information to the news service server over the Internet; the news service server for extracting aspects from the received news article information, classifying the news article information based on the extracted aspects, and transmitting the aspect-level news article information to the user terminal depending on the aspects to enable the aspect-level news article information to be displayed; and the Internet configured to connect the user terminal to the news service server.

The user terminal may be one of a Personal Computer (PC), a Personal Digital Assistant (PDA), and a mobile phone.

The news service server may comprise an article gathering unit for gathering news article information from the news provision server and storing the gathered news article information; an aspect extraction unit for extracting keywords from the news article information stored in the article gathering unit, calculating importance levels of the extracted keywords, and extracting aspects of news articles based on the importance levels; an aspect classification unit for classifying the news article information into groups, based on the aspects extracted by the aspect extraction unit; and an article provision unit for transmitting the aspect-level news information, classified by the aspect classification unit into groups, to the user terminal over the Internet and enabling the aspect-level news information to be displayed on the user terminal.

The aspect extraction unit may comprise a keyword extractor for extracting the keywords from the news article information received by the news service server; an importance level calculator for calculating the importance levels of the extracted keywords; and a keyword classifier for classifying the extracted keywords into common keywords and uncommon keywords.

The aspect classification unit may comprise a commonness calculator for calculating any one of commonness ($Cn(cKi)$) and uncommonness ($Un(uKi)$) of each of the keywords, and calculating commonness ($Cn(a_m)$) and uncommonness ($Un(a_m)$) of each of news articles using the calculated commonness or uncommonness of the keyword; and a group classifier for classifying the news articles into groups based on the commonness or uncommonness of the news article.

The article provision unit may transmit the aspect-level news article information, classified by the aspect classification unit into groups, to the user terminal over the Internet and enable the aspect-level news information to be displayed on the user terminal for respective groups.

Further, the present invention may provide an aspect-level news browsing service method for mitigating effects of media bias, comprising (a) a news service server gathering news article information from a news provision server; (b) the news service server extracting aspects from the gathered news article information; (c) the news service server classifying the news article information into groups based on the extracted aspects; and (d) the news service server enabling aspect-level news information, classified based on the aspects, to be displayed on a user terminal over an Internet.

BRIEF DESCRIPTION OF THE DRAWINGS

Further features as well as the structure and operation of various embodiments are described in detail below with reference to the accompanying drawings, in which.

DESCRIPTION

Prior to describing detailed contents, it should be noted that components which are not directly related to the gist of the present disclosure are omitted.

Further, the terms and words used in the present specification and claims should be interpreted to have the meaning and concept relevant to the technical spirit of the present invention, on the basis of the principle by which the inventor can suitably define the implications of terms in the way which best describes the invention.

Hereinafter, the construction of an aspect-level news browsing service system and method for mitigating the effects of media bias according to an embodiment of the present invention will be described in detail with reference to FIG. 1.

Figure 1:
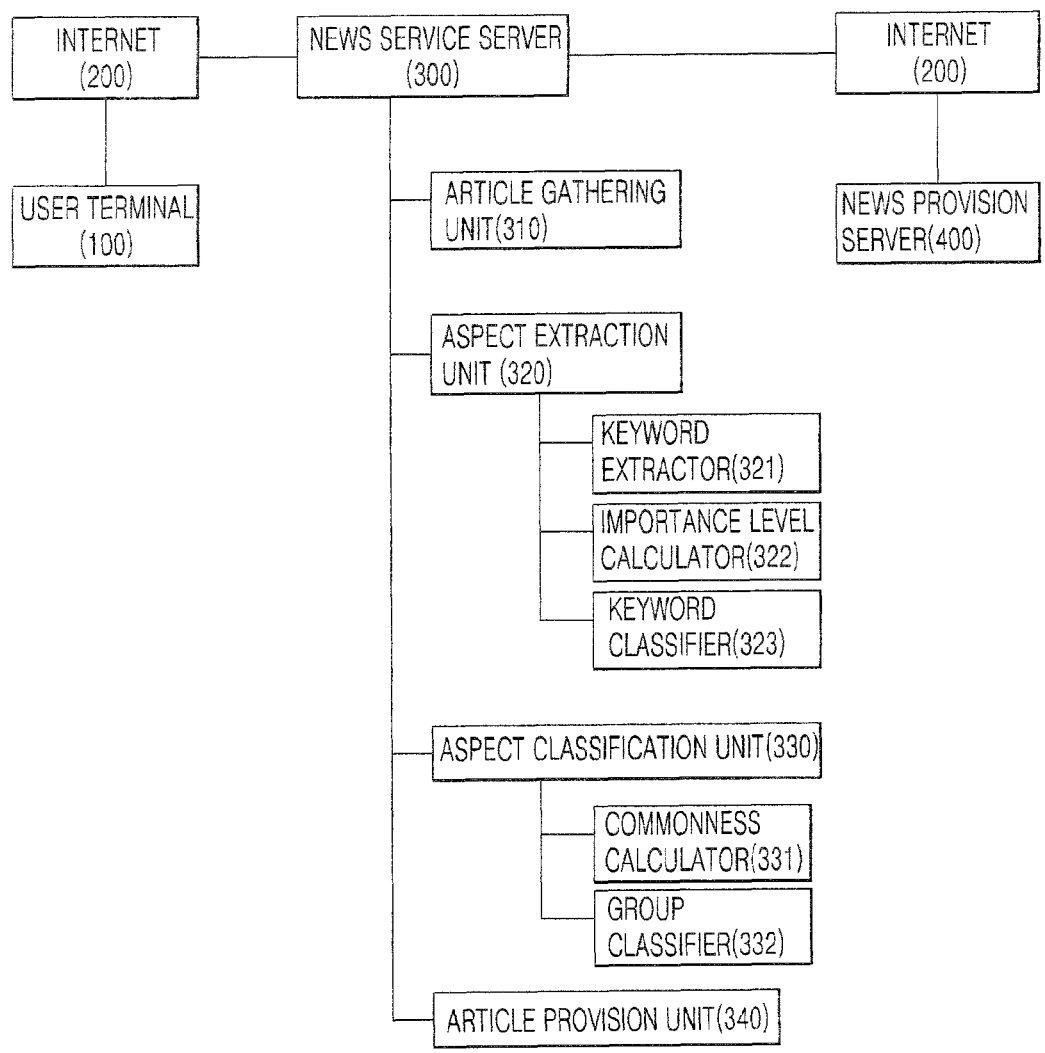
FIG. 1 is a diagram showing the construction of an aspect-level news browsing service system for mitigating the effects of media bias according to an embodiment of the present invention.

FIG. 1 is a diagram showing the construction of an aspect-level news browsing service system for mitigating the effects of media bias according to an embodiment of the present invention.

As shown in FIG. 1, the aspect-level news browsing service system for mitigating the effects of media bias according to an embodiment of the present invention includes a user terminal 100, an Internet 200, a news service server 300, and a news provision server 400.

The user terminal 100 is connected to the news service server 300 over the Internet 200. A user accesses the news service server 300 using the user terminal 100 over the Internet 200, and is then provided with aspect-level news article information classified based on various aspects on the same event.

The Internet 200 functions to enable the connection between the user terminal 100 and the news service server 300 and the connection between the news service server 300 and the news provision server 400, and includes the wired Internet based on Transmission Control Protocol/Internet Protocol (TCP/IP) and the wireless Internet based on a Wireless Application Protocol (WAP).

The news service server 300 accesses the news provision server 400 to gather news article information, extracts keywords from the gathered news article information, calculates the importance levels of the keywords, extracts aspects from the news article information, classifies the news article information into groups on the basis of the extracted aspects, and transmits the classified news article information to the user terminal 100 to enable the news article information to be displayed thereon. The news service server 300 includes an article gathering unit 310, an aspect extraction unit 320, an aspect classification unit 330, and an article provision unit 340.

The article gathering unit 310 accesses the news provision server 400 over the Internet 200, and then gathers and stores news article information.

The aspect extraction unit 320 functions to extract aspects from the news article information gathered by the article gathering unit 310, and includes a keyword extractor 321, an importance level calculator 322, and a keyword classifier 323.

In the present invention, the concept of the aspects of the news article information may be defined by thematic proposition composed of the elements of a news article. A news article has an agent, an action, a scene and an implication as its elements. The thematic proposition has an agent as its subject, and other elements of the news article as its predicate. The thematic proposition is established in different forms, even in the case of a news article on the same event, depending on which element is to be selected from among the elements of the news article included in the thematic proposition and which element is to be emphasized. Therefore, news articles having different aspects are provided to readers.

For example, at the time of reporting a news article on the same scene of a demonstration, news articles corresponding to different aspects are generated depending on whether, among the extracted keywords, a policeman is to be regarded as the agent, or whether a demonstrator is to be regarded as the agent.

In order to extract aspects, the present invention may use a news structure-based extraction technique. This technique is a method based on the writing rules of an inverted pyramid structure generally used in news reporting, and is configured to extract aspects in consideration of the elements of a news article.

In more detail, a news article is composed of a head, a subhead, a lead indicating a first sentence or the first two sentences of the news article, and main text, according to the inverted pyramid structure that is generally used.

Accordingly, the news structure-based extraction technique used in the present invention may be configured to extract keywords from the core parts of a news article, that is, a head, a subhead, and a lead indicating the first sentence or the first two sentences of a news article. The keywords are extracted in consideration of the elements of the news article. Further, the extracted keywords reflect aspects appearing in the relevant news article.

Next, a procedure for calculating the importance levels of keywords extracted from the main text of the news article and determining the importance levels of aspects reflected in the keywords is performed, and then an aspect having the highest importance level is extracted from the news article.

In this case, the keyword extractor 321 functions to extract keywords from the news article information received by the news service server 300.

In more detail, a news article is composed of a head, a subhead, a lead indicating the first sentence or the first two sentences of the news article, and main text according to the inverted pyramid structure that is generally used.

On the basis of this structure, the keyword extractor 321 extracts keywords from the core parts of the news article information, that is, the head, subhead and lead, and then extracts only keywords having a high probability of being the agent of an event covered in the news article information or being the description of the agent by analyzing the morphemes of the keywords.

In addition, since the keyword extractor 321 regards a sequence of keywords (for example, President Bush) constituting a noun phrase as a single semantic entity, agents are more precisely determined.

The reason for precisely extracting keywords in this way is that the extracted keywords reflect aspects covered in news article information, and thus the extraction of keywords irrelevant to aspects decreases the precision of the extraction of aspects from news article information.

The importance level calculator 322 functions to calculate the importance levels of the extracted keywords.

The importance levels of keywords can be calculated using various methods, but a method of calculating importance levels on the basis of four variables, that is, the frequency of each keyword, the length of a sentence including the keyword, and the location and length of a paragraph including the keyword, may be used.

First, in order to consider importance levels based on the location of a paragraph or sentence including a relevant keyword, a diminishing factor is used. Second, the ratio of the length of phrases including the keyword to the total length of news article information is used. Third, the ratio of the length of sentences including the keyword to the total length of the news article information is used. Finally, in order to reflect the frequency of the keyword appearing in a relevant article, the sum of importance levels obtained when the keyword appears is obtained. In accordance with this, the importance level of the keyword becomes higher as it is covered in the first part of main text and repeatedly appears, and the sentence or paragraph including the keyword is lengthened. An equation for calculating the above-described importance level of a keyword and variables used in the equation are given by Equation (1) and Table 1, respectively.

TABLE 1

| Symbol | Description |
|---|---|
| A(i) | i-th article in set of articles |
| La(i) | Length of A(i) |
| Lp(i, j) | Length of j-th paragraph in A(i) |
| Ls(i, k) | Length of k-th sentence in A(i) |
| W(i) | Set of keywords of A(i) |
| Wn | n-th keyword of W(i) |
| Vn | Importance level of Wn |
| Va(i) | Set of pairs of keywords and importance levels |
| $D_{pj}$ | Diminishing factor of j-th paragraph in A(i) |
| $D_{sk}$ | Diminishing factor of k-th sentence in A(i) |

$$w_n = \sum_{j,k} \left( \frac{Lp(i,j)}{La(i)} d_{pj} + \frac{Ls(i,k)}{La(i)} d_{sk} \right) \quad (1)$$

$$d_{pj} = 1 - \sum_{m=1}^{j-1} \frac{Lp(i,m)}{La(i)}, \ d_{p1} = 1$$

$$d_{sk} = 1 - \sum_{m=1}^{j-1} \frac{Ls(i,m)}{La(i)}, \ d_{s1} = 1$$

The keyword classifier 323 functions to classify the extracted keywords into common keywords and uncommon keywords.

In more detail, in the present invention, the concepts of a common keyword and an uncommon keyword are defined to classify the keywords of news article information.

The term 'common keyword' means a keyword reflecting an aspect covered in common by a large number of news articles, and the term 'uncommon keyword' means a keyword reflecting an aspect covered in a small number of news articles.

In addition, the criteria required to classify keywords into common keywords and uncommon keywords can be defined by the following Equation (2), $$cK = \{cKi \mid cKi \in K, \text{app\_r}(cKi) \geq HgP\} \quad (2)$$

$$uK = \{uKi \mid uKi \in K, \text{app\_r}(uKi) < HgP\}$$

$$\text{app\_r}(Ki) = \frac{\text{app\_c}(Ki)}{n}$$

where K is a total set of keywords included in all news articles on the same event, cK is a set of common keywords included in all news articles on the same event, and uK is a set of uncommon keywords included in all news articles on the same event. Further, n is the total number of all news articles on the same event.

Further, in Equation (2), app_c(Ki) is the number of news articles in which a keyword Ki appears, and app_r(Ki) is the ratio of the number of news articles, in which the keyword Ki appears, to the total number of all news articles. Further, Head Group Proportion (HgP) is the ratio of a portion occupied by a head group to the entire portion of all news articles.

In other words, common keywords are keywords reflecting a head group, and uncommon keywords are keywords reflecting a non-head group.

Next, the aspect classification unit 330 functions to classify the aspects of the news article information extracted by the aspect extraction unit 320 into groups of the same aspects, and includes a commonness calculator 331 and a group classifier 332.

A group of news articles covering the typical aspect of an event may be defined as a head group and a group of news articles covering other aspects of the event is defined as a non-head group when groups of news articles are classified.

In more detail, the present invention may adopt a Framing Cycle-Aware Clustering (FCAC) method to group news articles having similar aspects and to provide grouped news articles.

FCAC is a method exploiting the characteristics of news that, in the initial stage of the occurrence of an event, a plurality of news articles covering similar aspects is issued, and, with the passage of time, news articles covering different aspects are issued.

For example, news articles on the same event exhibit a head-tail characteristic, which means that a large number of news articles cover a common aspect in a head part and a small number of news articles cover various aspects in a tail part in the initial stage of the case.

A head-tail model is defined to describe a set of news articles on the same event on the basis of the above characteristic, and is represented by the following Equation (3), $$A = Hg \cup \left( \bigcup_{i=1}^{n} Tg_i \right) \quad (3)$$

$$|Hg| = HgP \times |A|$$

$$\left| \bigcup_{i=1}^{n} Tg_i \right| = (1 - HgP) \times |A|$$

where A is a total set of news articles on the same event, and is separated into one head group Hg and several tail groups Tg. In addition, Head Group Proportion (HgP) is the ratio of a portion occupied by a head group to the entire portion of all news articles.

A K-means or a hierarchical clustering method, which is generally used, analyzes similarity between weights present in repeated keywords of news articles. Accordingly, when news articles share only a small number of keywords with one another, there is a high possibility of classifying the news articles into different groups.

In contrast, the FCAC method presented in the present invention may be configured such that, even if news articles share only a small number of keywords, when the relevant keywords are common keywords, the news articles can be classified as the same group, thus enabling the classification of news articles based on aspects to be more efficiently performed.

In this case, the commonness calculator 331 calculates the commonness Cn(cKi) or uncommonness Un(uKi) of the common keywords and uncommon keywords, classified by the keyword classifier 323, by using the following Equation (4), $$Cn(cKi) = \text{app\_r}(cKi) \cdot \text{avg\_w}(cKi) \quad (4)$$

$$Un(uKi) = (1 - \text{app\_r}(cKi)) \cdot \text{avg\_w}(uKi)$$

$$\text{avg\_w}(Ki) = \frac{\sum_{m=1}^{\text{app\_c}(Ki)} w(m)}{\text{app\_c}(Ki)}$$

where Cn(cKi) is the commonness of a keyword Ki included in news articles and Un(uKi) is the uncommonness of the keyword Ki included in the news articles. Further, w(m) is the weight of the keyword Ki included in the news articles and avg_w(Ki) is the average weight of the keyword Ki included in the news articles. Further, app_c(Ki) is the number of news articles in which the keyword Ki appears, and app_r(Ki) is the ratio of the number of news articles in which the keyword Ki appears to the total number of all news articles.

The calculated commonness of a relevant keyword has a tendency to increase as the keyword appears in a larger number of news articles. In contrast, the uncommonness of a relevant keyword has a tendency to increase as the keyword appears in a smaller number of news articles.

Further, on the basis of the commonness Cn(cKi) or the uncommonness Un(uKi) of each keyword calculated by the above Equation (4), the commonness $Cn(a_m)$ and uncommonness $Un(a_m)$ of the news articles are respectively calculated as the weighted sum of Cn values and the weighted sum of Un values of keywords included in the news articles. Therefore, the commonness and the uncommonness of the news articles including keywords are calculated by the following Equation (5), $$Cn(a_m) = \Sigma Cn(k_j) \cdot w_j$$

$$Un(a_m) = \Sigma Un(k_l) \cdot w_l \quad (5)$$

where $Cn(a_m)$ is the commonness of any news article $a_m$ and $Un(a_m)$ is the uncommonness of the news article $a_m$. Further, $k_j$ and $k_l$ are keywords included in the news article $a_m$, wherein $k_j$ is any common keyword and $k_l$ is any uncommon keyword. Further, $w_j$ is the weight of any common keyword $k_j$ included in the news article $a_m$ and $w_l$ is the weight of any uncommon keyword $k_l$ included in the news article $a_m$.

The group classifier 332 repeatedly performs the function of aligning news articles according to the magnitude of the ratio of uncommonness $Un(a_m)$ to commonness $Cn(a_m)$ of each news article calculated by the commonness calculator 331, and sequentially excluding news articles, the ratio of uncommonness $Un(a_m)$ to commonness $Cn(a_m)$ of which is greater than the ratio HgP of a portion occupied by the head group to the entire portion of all news articles. Therefore, the group classifier 332 classifies the remaining news articles, which are not excluded at the time of completing the repetition, as a head group.

In this case, the ratio of the portion occupied by the head group to the entire portion of all news articles is a value by which a head group and a non-head group are definitely separated from each other, and is selected by the group classifier 332. For this purpose, the group classifier 332 repeatedly performs the above function while adjusting the ratio HgP of the portion occupied by the head group to the entire portion of all news articles.

The degree of separation of a head group and a non-head group is determined using the difference between the ratios of uncommonness to commonness of the two groups.

In more detail, the degree of separation means the difference between a news article, the ratio of uncommonness to commonness of which is the highest value, among the news articles belonging to the head group, and a news article, the ratio of uncommonness to commonness of which is the lowest value, among the news articles belonging to the non-head group. Further, it can be determined that, as the difference is larger, the degree of separation is larger.

Figure 2:
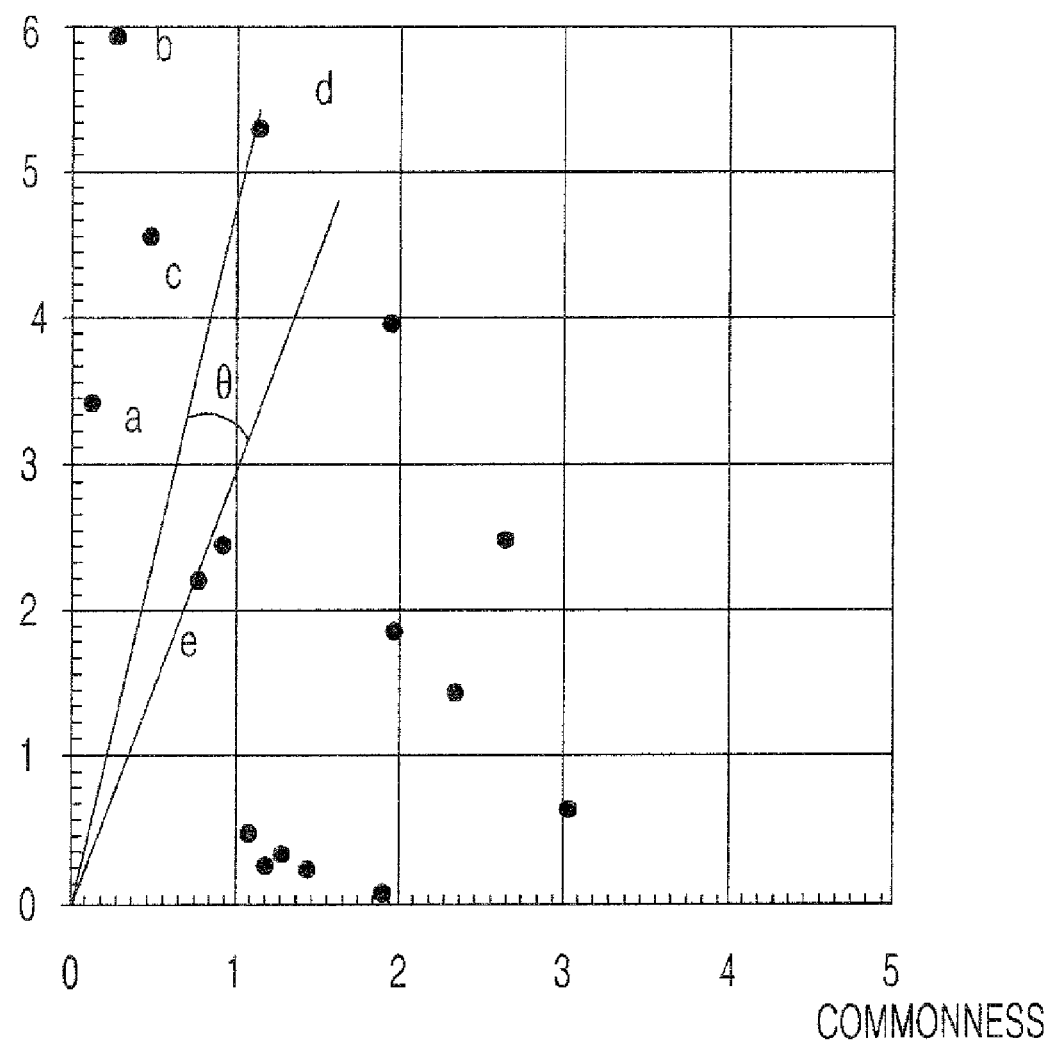
FIG. 2 is a diagram showing an example of news article information classified by the aspect-level news browsing service system for mitigating the effects of media bias according to an embodiment of the present invention.

By way of example, a description will be made with reference to FIG. 2. FIG. 2 is a graph showing the ratio of uncommonness to commonness of 16 news articles, wherein respective points indicate corresponding news articles.

An angle θ between a point d and a point e indicates the degree of separation of a head group and a non-head group, an angle between each point and the origin of the graph indicates the ratio of uncommonness to commonness of each news article. FIG. 2 shows that the ratio of a portion occupied by the head group to the entire portion of all news articles is set to 0.25, and, as a result, four news articles a, b, c and d are excluded from the head group.

Thereafter, the group classifier 332 analyzes the similarities of only uncommon keywords belonging to news articles so as to newly classify the non-head group, which is a group of news articles not belonging to the head group, into tail groups. The reason for this is that there is a low possibility that articles, having different aspects, come to share uncommon keywords.

Moreover, the analysis of similarities may be performed using similarity graph-based clustering technique, and a similarity measure is implemented as a cosine measure.

Figure 8:
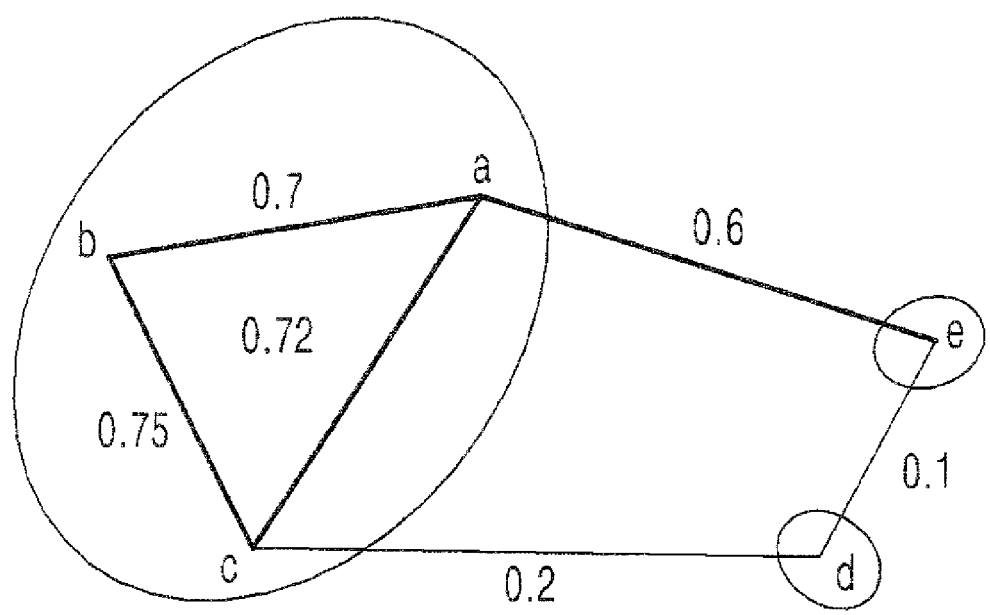
FIG. 8 is a graph showing a procedure for classifying a non-head group into tail groups in a group classifier according to an embodiment of the present invention.

By way of example, a description will be made with reference to FIG. 8. FIG. 8 is a graph showing a procedure for classifying a non-head group into tail groups. Respective news articles are vertexes of the graph, and the similarities between news articles are the weights of edges which connect adjacent vertexes to each other. In order to classify the articles of the non-head group on the basis of aspects, edges shorter than a specific threshold value in the graph are cut away. In the present invention, the average of similarities except for 0 may be used as the threshold value. In the graph, the vertexes that are connected to each other form each tail group. It can be seen in FIG. 8 that the non-head group is classified into three tail groups, respectively including news articles {a, b, c}, {d} and {e}.

Meanwhile, the article provision unit 340 functions to transmit aspect-level news article information, classified by the aspect classification unit 330 into groups, to the user terminal 100 over the Internet 200, and enable the aspect-level news article information for respective groups to be displayed on the user terminal 100.

Figure 6:
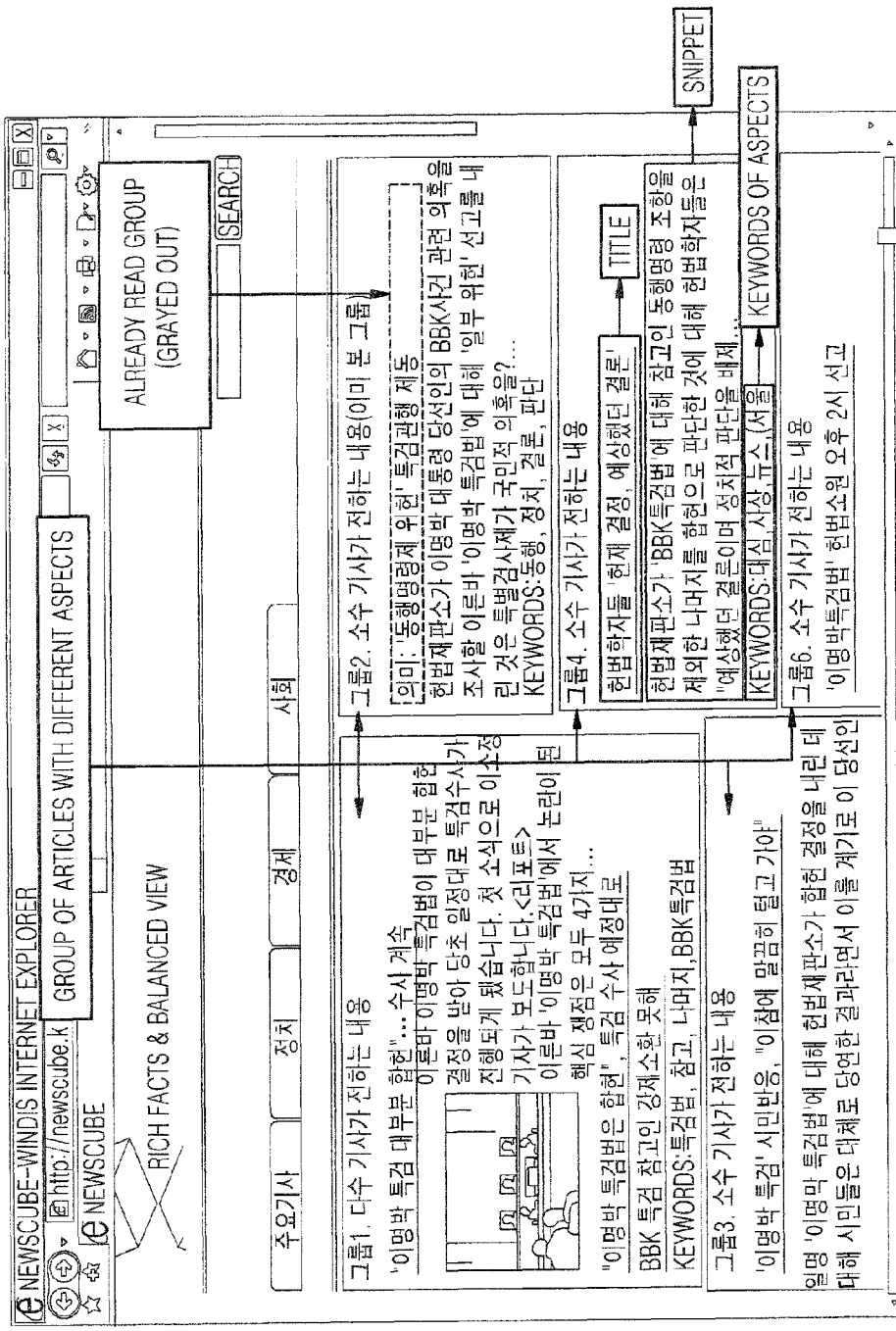
FIG. 6 is a view showing the main screen of a user terminal according to an embodiment of the present invention.
Figure 7:
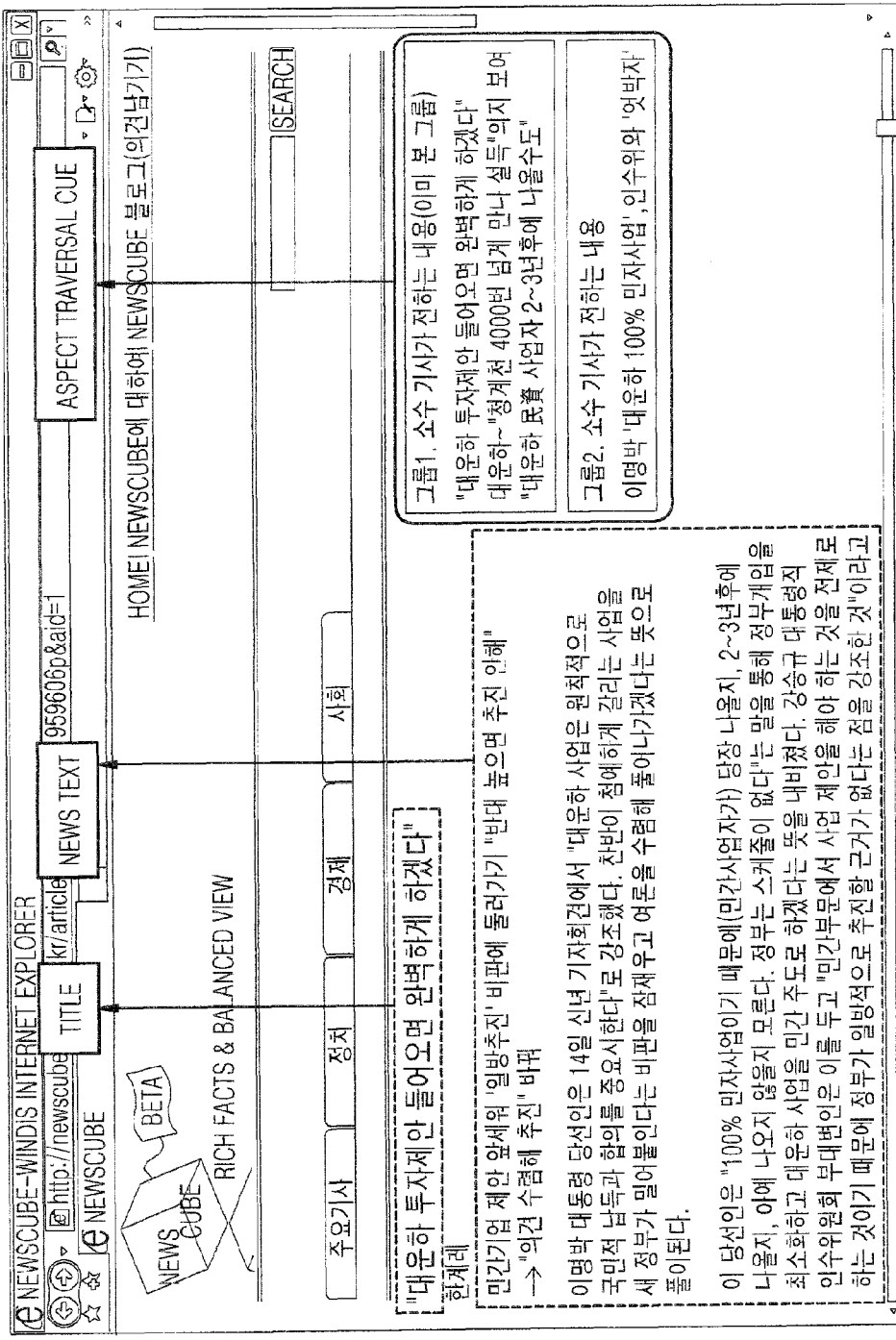
FIG. 7 is a view showing one screen of the user terminal according to an embodiment of the present invention.

As shown in FIG. 6, the news service server 300 may allocate areas having the same size to news article groups having different aspects in the user terminal 100 and enables the news article groups to be displayed on the areas. In addition, as shown in FIG. 7, the news service server 300 may enable the news article of an aspect area, which has already been read by the user terminal 100, to be displayed as a grayed-out portion.

Hereinafter, the construction of an aspect-level news browsing service method for mitigating the effects of media bias according to an embodiment of the present invention will be described with reference to FIGS. 3 to 5.

Figure 3:
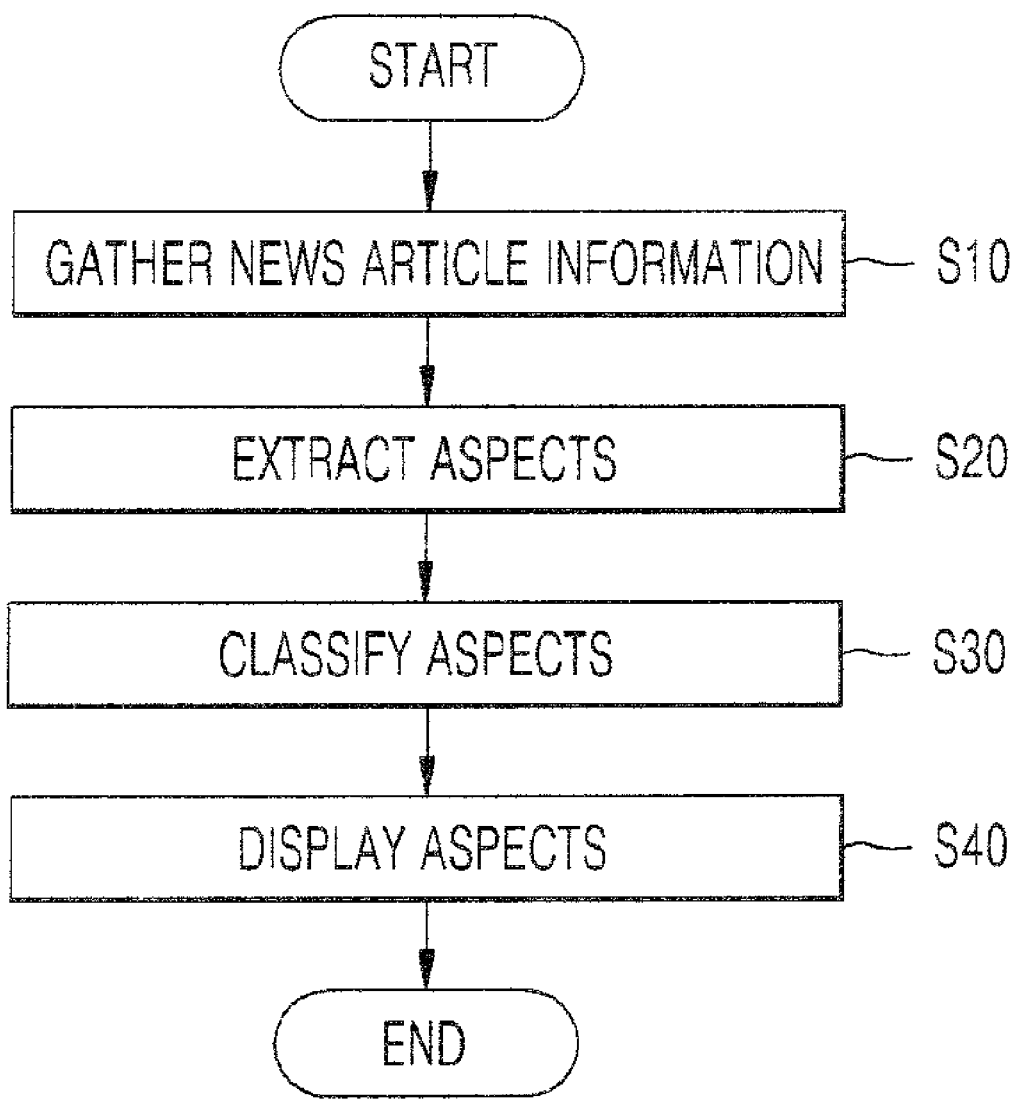
FIG. 3 is an overall flowchart showing an aspect-level news browsing service method according to an embodiment of the present invention.
Figure 4:
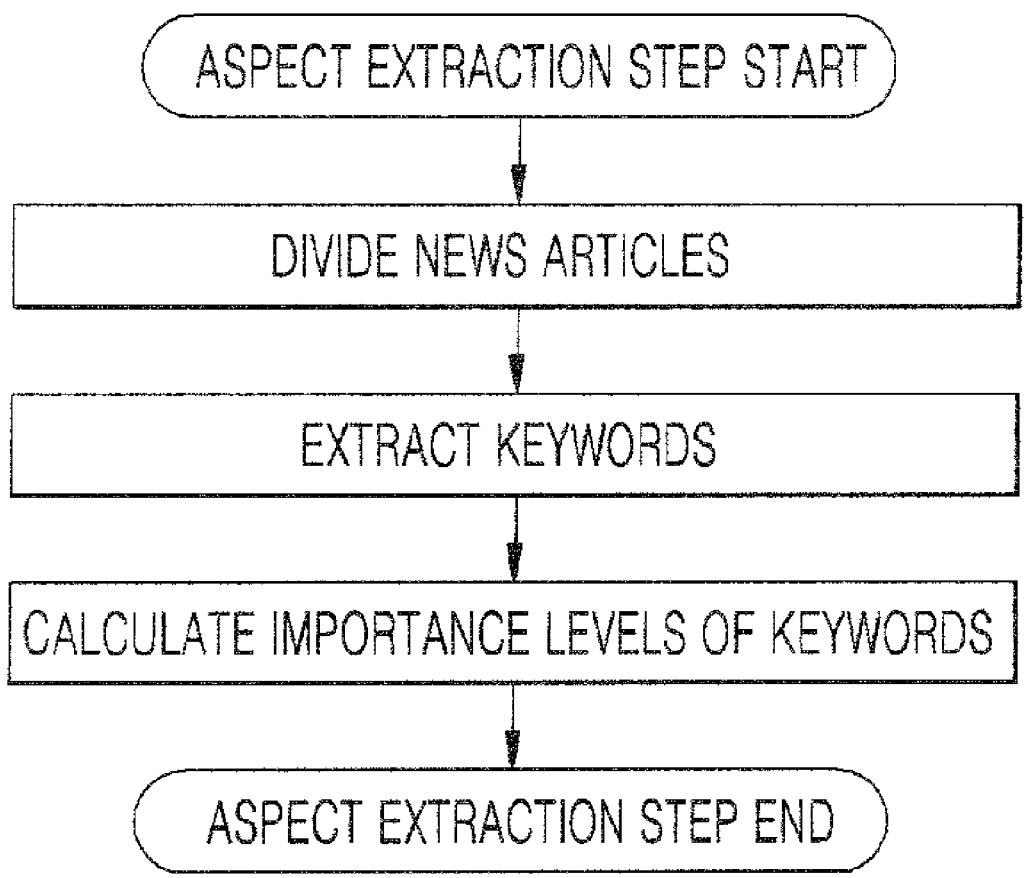
FIG. 4 is a detailed flowchart showing the aspect extraction step of the aspect-level news browsing service method according to an embodiment of the present invention.
Figure 5:
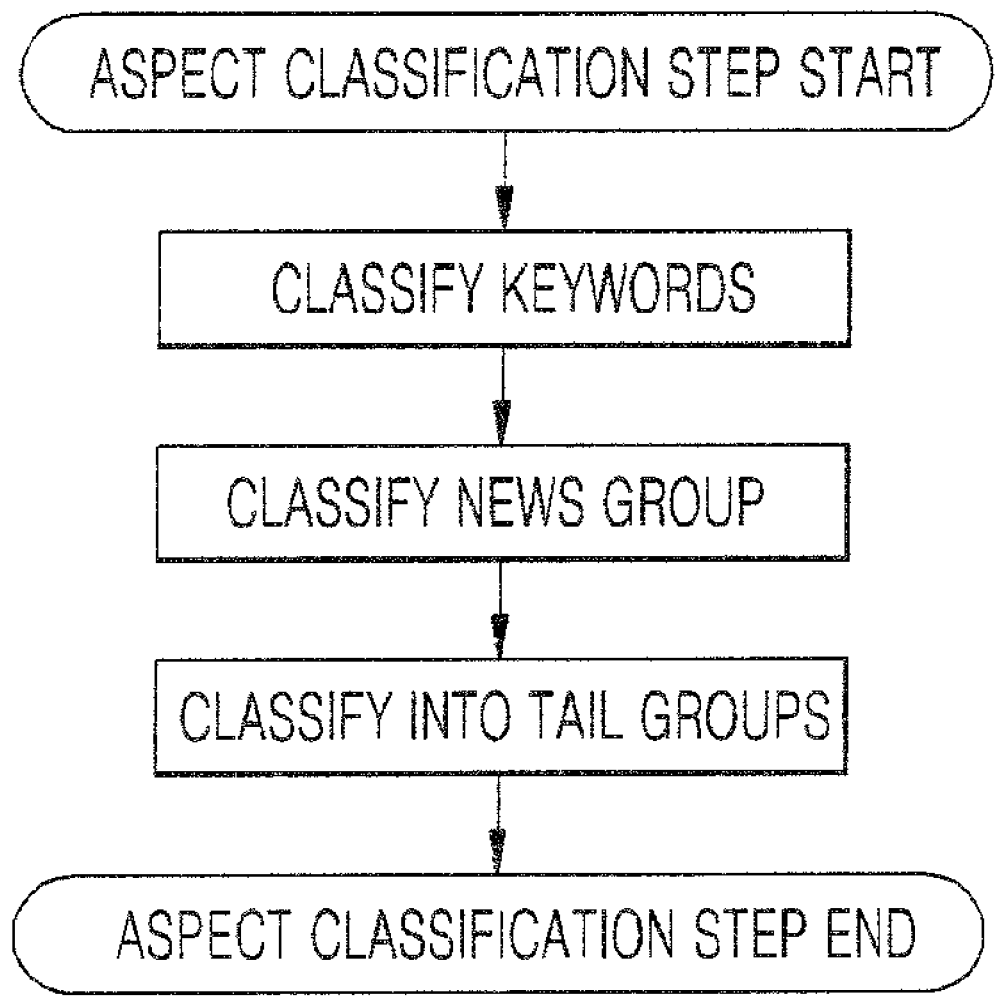
FIG. 5 is a detailed flowchart showing the aspect classification step of the aspect-level news browsing service method according to an embodiment of the present invention.

FIG. 3 is an overall flowchart showing an aspect-level news browsing service method according to an embodiment of the present invention, FIG. 4 is a flowchart showing the aspect extraction step of the aspect-level news browsing service method according to an embodiment of the present invention, and FIG. 5 is a flowchart showing the aspect classification step of the aspect-level news browsing service method according to an embodiment of the present invention.

As shown in FIG. 3, the article gathering unit 310 of the news service server 300 accesses the news provision server 400 over the Internet 200 and gathers and stores news article information at step S10.

Next, the aspect extraction unit 320 of the news service server 300 extracts the aspects of news articles from the news article information gathered by the article gathering unit 310 at step S20.

Step S20 may include the step of dividing the news article information into a head, a subhead, a lead and main text, the step of extracting keywords from the head, subhead, lead and main text, and calculating the importance levels of the extracted keywords.

The step of dividing the news article information into the head, subhead, lead and main text may include the step of regarding a sequence of keywords constituting a noun phrase as a single entity, and the step of extracting words or phrases which are agents or the descriptions of agents.

Next, the aspect classification unit 330 of the news service server 300 classifies the news article information on the basis of the extracted aspects, and groups classified news articles at step S30.

Step S30 may include the step of classifying the extracted keywords into common keywords and uncommon keywords, the step of classifying the news article information into a head group and a non-head group, and the step of newly classifying the non-head group into one or more tail groups.

The step of classifying the keywords into common keywords and uncommon keywords may include the step of determining both the ratio of the number of news articles, in which a relevant keyword appears, to the total number of all news articles, and the ratio HgP of the portion occupied by the head group to the entire portion of all news articles, by using the above Equation (2).

Further, the step of newly classifying the non-head group into one or more tail groups may include the step of analyzing the similarities of uncommon keywords belonging to the non-head group.

Furthermore, the step of classifying the news article information into a head group and a non-head group may include the step of calculating the commonness $Cn(cKi)$ or the uncommonness $Un(uKi)$ of keywords included in the news article information, the step of calculating the commonness and uncommonness of relevant news articles using the commonness or uncommonness values of the keywords, the step of aligning all the news articles according to the magnitude of the ratio of uncommonness to commonness thereof the step of excluding news articles, the ratio of uncommonness to commonness of which is greater than the ratio of the portion occupied by the head group to the entire portion of all news articles, from the head group, and the step of repeatedly performing the step of excluding news articles, the ratio of uncommonness $Un(a_m)$ to commonness $Cn(a_m)$ of which is greater than the ratio HgP of the portion occupied by the head group to the entire portion of all news articles, from the head group until the ratio of a portion of news articles, remaining in the head group without being excluded, to the portion occupied by the head group becomes identical to the ratio of the portion occupied by the head group to the entire portion of all news articles.

In addition, the step of calculating the commonness $Cn(cKi)$ or uncommonness $Un(uKi)$ of the keywords included in the news articles may be performed using Equation (4).

Further, the step of calculating the commonness and uncommonness of relevant news articles using the commonness or uncommonness values of the keywords may be performed using Equation (5).

Next, the article provision unit 340 of the news service server 300 enables the news articles classified into groups on the basis of the aspects to be displayed on the user terminal 100 at step S40.

Step S40 may include the step of the news service server 300 allocating areas having the same size to news article groups having different aspects in the user terminal 100 and enabling the news article groups to be displayed on the areas, as shown in FIG. 6, and the step of the news service server 300 enabling the news article of an aspect area, which has already been read by the user terminal 100, to be displayed as a grayed-out portion, as shown in FIG. 7.

Hereinafter, the results of evaluation of whether the classification of news articles based on aspect levels in the present invention has been effectively performed will be described.

An evaluation basis is established to determine a degree in which the results of clustering performed using the clustering method of the present invention, that is, FCAC, the results of clustering performed using conventional clustering methods, that is, spectral clustering, K-means clustering, and Hierarchical Agglomerative clustering (HAC), and the results of clustering performed by a person are similar to one another. Table 2 shows the results of the measurement of similarities performed based on the evaluation basis.

TABLE 2

|  | Mean F[G, C] | No. of winning sets |
|---|---|---|
| Spectral(NSE) | 0.542 | 0 |
| K-means(NSE) | 0.587 | 0 |
| HAC(NSE) | 0.683 | 6 |
| FCAC(NSE) | 0.777 | 21 |
| Spectral(TF) | 0.527 | 0 |
| K-means(TF) | 0.567 | 0 |
| HAC(TF) | 0.654 | 3 |

In Table 2, F denotes an F-measure which is one method of representing similarity and has a value of 0 to 1. As F has a value closer to 0, the results of clustering performed by the clustering methods and the results of clustering performed by a person are similar to each other. Further, in Table 2, the term 'winning set' means the number of times that the value of F-measure among the clustering methods is highest when classification is performed on a set of 30 news articles.

As shown in the above results, it can be seen that the FCAC method adopted in the present invention derived the results of clustering most similar to those of the clustering performed by the person. Further, it can be seen that the present invention may effectively classify news articles on the basis of aspects, in that the method of the present invention derived the results of clustering most similar to those of the clustering performed by the person in 21 sets of news articles as a result of the clustering performed on a total of 30 sets of news articles.

As described above, since the present invention may allow users to read news articles classified based on aspects, the users can be actively aware of the effects of media bias. Therefore, the present invention may induce the users to overcome the effects of media bias based on being aware thereof.

Further, the present invention may allow users to understand news articles on the same topic from various viewpoints by consuming only a minimum of effort and time because a news service server automatically classifies news articles on the basis of aspects and provides the classified news articles.

Since users can actively understand the effects of media bias and can simultaneously read news articles having various aspects on a given event, extreme political polarization or conflicts of important social issues, occurring due to the biased understanding of the users, can be mitigated.

Various aspects of the present disclosure may be stored as a program, software, or computer instructions in a computer or machine usable or readable storage medium, which for example causes the computer or machine to perform the steps of the method when executed on the computer, processor, and/or machine.

The computer system and computer network as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some functionality, which can be embodied as software, hardware, firmware, electronic circuitry, or etc.

Although the embodiments of the present invention have been disclosed for illustrative purposes, those skilled in the art will appreciate that the present invention is not limited to the above embodiments, and various modifications, additions and substitutions are possible, without departing from the scope and spirit of the invention as disclosed in the accompanying claims. Therefore, all suitable changes and modifications and equivalents of the present invention should be interpreted as being included in the scope of the present invention.

What is claimed is:

1. An aspect-level news browsing service system for mitigating effects of media bias, comprising:
    a user terminal for accessing a news service server over an Internet and receiving aspect-level news article information from the news service server;
    a news provision server for transmitting news article information to the news service server over the Internet;
    the news service server for extracting aspects from the received news article information, classifying the news article information based on the extracted aspects, and transmitting the aspect-level news article information to the user terminal depending on the aspects to enable the aspect-level news article information to be displayed, wherein said aspects are defined by thematic proposition composed at least of an agent and an action, and wherein said news service server extracts said aspects based on a news structure-based extraction technique including extracting at least keywords descriptive of the agent of an event covered in the news article information; and
    the Internet configured to connect the user terminal to the news service server.

2. The aspect-level news browsing service system according to claim 1, wherein the user terminal is one of a Personal Computer (PC), a Personal Digital Assistant (PDA), and a mobile phone.

3. The aspect-level news browsing service system according to claim 1, wherein the news service server comprises:
    an article gathering unit for gathering news article information from the news provision server and storing the gathered news article information;
    an aspect extraction unit for extracting keywords from the news article information stored in the article gathering unit, calculating importance levels of the extracted keywords, and extracting aspects of news articles based on the importance levels;
    an aspect classification unit for classifying the news article information into groups, based on the aspects extracted by the aspect extraction unit; and
    an article provision unit for transmitting the aspect-level news information, classified by the aspect classification unit into groups, to the user terminal over the Internet and enabling the aspect-level news information to be displayed on the user terminal.

4. The aspect-level news browsing service system according to claim 3, wherein the aspect extraction unit comprises:
    a keyword extractor for extracting the keywords from the news article information received by the news service server;
    an importance level calculator for calculating the importance levels of the extracted keywords; and
    a keyword classifier for classifying the extracted keywords into common keywords and uncommon keywords.

5. The aspect-level news browsing service system according to claim 4, wherein the aspect classification unit comprises:
    a commonness calculator for calculating any one of commonness (Cn(cKi)) and uncommonness (Un(uKi)) of each of the keywords, and calculating commonness (Cn($a_m$)) and uncommonness (Un($a_m$)) of each of news articles using the calculated commonness or uncommonness of the keyword; and
    a group classifier for classifying the news articles into groups based on the commonness or uncommonness of the news article.

6. The aspect-level news browsing service system according to claim 5, wherein the commonness calculator calculates the commonness (Cn(cKi)) or uncommonness (Un(uKi)) of the keyword by using the following equation:

$$Cn(cKi) = \text{app\_r}(cKi) \cdot \text{avg\_w}(cKi)$$

$$Un(uKi) = (1 - \text{app\_r}(cKi)) \cdot \text{avg\_w}(uKi)$$

$$\text{avg\_w}(Ki) = \frac{\sum_{m=1}^{\text{app\_c}(Ki)} w(m)}{\text{app\_c}(Ki)}$$

where Cn(cKi) is a commonness of a keyword Ki included in relevant news articles, Un(uKi) is an uncommonness of the keyword Ki included in the relevant news articles, w(m) is a weight of the keyword Ki included in the news articles, avg_w(Ki) is an average weight of the keyword Ki included in the news articles, app_c(Ki) is a number of news articles in which the keyword Ki appears, and app_r(Ki) is a ratio of the number of news articles, in which the keyword Ki appears, to a total number of all news articles.

7. The aspect-level news browsing service system according to claim 5, wherein the commonness calculator calculates the commonness ($Cn(a_m)$) and uncommonness ($Un(a_m)$) of a relevant news article by using the following equation:

$$Cn(a_m) = Cn(k) \cdot w_j$$

$$Un(a_m) = Un(k_l) \cdot w_l$$

where $Cn(a_m)$ is a commonness of any news article $a_m$, $Un(a_m)$ is an uncommonness of the news article $a_m$, $k_j$ and $k_l$ are keywords included in the news article $a_m$, $k_j$ being any common keyword and $k_l$ being any uncommon keyword, $w_j$ is a weight of the common keyword $k_j$, and $w_l$ is a weight of the uncommon keyword $k_l$.

8. An aspect-level news browsing service method for mitigating effects of media bias, comprising:
(a) a news service server gathering news article information from a news provision server;
(b) the news service server extracting aspects from the gathered news article information, said aspects defined by thematic proposition composed at least of an agent and an action, and wherein said aspects are extracted based on a news structure-based extraction technique including extracting at least keywords descriptive of the agent of an event covered in the news article information;
(c) the news service server classifying the news article information into groups based on the extracted aspects; and
(d) the news service server enabling aspect-level news information, classified based on the aspects, to be displayed on a user terminal over an Internet.

9. The aspect-level news browsing service method according to claim 8, wherein (b) comprises:
(b-1) classifying the news article information into a head, a subhead, a lead and main text;
(b-2) extracting keywords from the head, subhead, lead and main text; and
(b-3) calculating importance levels of the extracted keywords.

10. The aspect-level news browsing service method according to claim 9, wherein (b-1) comprises:
(b-1-1) regarding a sequence of keywords constituting a noun phrase as a single entity; and
(b-1-2) extracting words or phrases which are agents or descriptions of the agents.

11. The aspect-level news browsing service method according to claim 8, wherein (c) comprises:
(c-1) classifying the keywords extracted from the news article information into common keywords and uncommon keywords;
(c-2) classifying the news article information into a head group and a non-head group; and
(c-3) newly classifying the non-head group into one or more tail groups.

12. The aspect-level news browsing service method according to claim 11, wherein (c-2) comprises:
(c-2-1) calculating commonness ($Cn(cKi)$) or uncommonness ($Un(uKi)$) of each keyword included in the news article information;
(c-2-2) calculating commonness ($Cn(a_m)$) and uncommonness ($Un(a_m)$) of a relevant news article using the commonness or the uncommonness of the keyword;
(c-2-3) aligning all news articles according to a magnitude of a ratio of uncommonness to commonness thereof;
(c-2-4) excluding news articles, a ratio of uncommonness to commonness of which is greater than a ratio of a portion occupied by the head group to an entire portion of all news articles, from the head group; and
(c-2-5) repeatedly performing excluding of news articles, the ratio of uncommonness to commonness of which is greater than the ratio of the portion occupied by the head group to the entire portion of all news articles, from the head group until the ratio of a portion of news articles, remaining in the head group without being excluded, to the portion occupied by the head group becomes identical to the ratio of the portion occupied by the head group to the entire portion of all news articles.

13. The aspect-level news browsing service method according to claim 12, wherein (c-2-1) is performed to calculate the commonness ($Cn(cKi)$) or uncommonness ($Un(uKi)$) of the keyword by using the following equation:

$$Cn(cKi) = \text{app\_r}(cKi) \cdot \text{avg\_w}(cKi)$$

$$Un(uKi) = (1 - \text{app\_r}(cKi)) \cdot \text{avg\_w}(uKi)$$

$$\text{avg\_w}(Ki) = \frac{\sum_{m=1}^{\text{app\_c}(Ki)} w(m)}{\text{app\_c}(Ki)}$$

where $Cn(cKi)$ is a commonness of a keyword Ki included in relevant news articles, $Un(uKi)$ is an uncommonness of the keyword Ki included in the relevant news articles, $w(m)$ is a weight of the keyword Ki included in the news articles, $\text{avg\_w}(Ki)$ is an average weight of the keyword Ki included in the news articles, $\text{app\_c}(Ki)$ is a number of news articles in which the keyword Ki appears, and $\text{app\_r}(Ki)$ is a ratio of the number of news articles, in which the keyword Ki appears, to a total number of all news articles.

14. The aspect-level news browsing service method according to claim 12, wherein (c-2-2) is performed to calculate the commonness ($Cn(a_m)$) and uncommonness ($Un(a_m)$) of a relevant news article by using the following equation:

$$Cn(a_m) = \Sigma Cn(k_j) \cdot w_j$$

$$Un(a_m) = \Sigma Un(k_l) \cdot w_l$$

where $Cn(a_m)$ is a commonness of any news article $a_m$, $Un(a_m)$ is an uncommonness of the news article $a_m$, $k_j$ and $k_l$ are keywords included in the news article $a_m$, $k_j$ being any common keyword and $k_l$ being any uncommon keyword, $w_j$ is a weight of the common keyword $k_j$, and $w_l$ is a weight of the uncommon keyword $k_l$.

15. The aspect-level news browsing service method according to claim 11, wherein (c-3) comprises:
(c-3-1) analyzing similarities of uncommon keywords belonging to the non-head group.

16. The aspect-level news browsing service method according to claim 8, wherein (d) comprises:
(d-1) the news service server allocating areas having an identical size to news article groups having different aspects in the user terminal, and enabling the news article groups to be displayed on the areas; and
(d-2) the news service server enabling a news article of an aspect area, which has already been read by the user terminal, to be displayed as a grayed-out portion.

* * * * *